(12) United States Patent
Sriram et al.

(10) Patent No.: US 8,812,374 B1
(45) Date of Patent: Aug. 19, 2014

(54) CLIENT-TO SERVICE COMPATIBILITY FRAMEWORK

(75) Inventors: Siddharth Sriram, Seattle, WA (US); Ameesh Paleja, Lynnwood, WA (US); Samuel S. Gigliotti, Seattle, WA (US); Ethan Z. Evans, Snoqualmie, WA (US); Kamlesh T. Talreja, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1180 days.

(21) Appl. No.: 12/165,188

(22) Filed: Jun. 30, 2008

(51) Int. Cl.
*G06Q 30/00* (2012.01)

(52) U.S. Cl.
USPC .......... 705/26.5; 705/26.1; 705/1.1; 705/14.4

(58) Field of Classification Search
CPC ...................................................... G06Q 30/00
USPC ............................................. 705/50–79, 26.5
See application file for complete search history.

(56) References Cited

U.S. PATENT DOCUMENTS

| | | | | |
|---|---|---|---|---|
| 7,305,697 | B2 * | 12/2007 | Alao et al. | 725/114 |
| 7,546,602 | B2 * | 6/2009 | Hejlsberg et al. | 719/313 |
| 2003/0194093 | A1 * | 10/2003 | Evans et al. | 380/282 |
| 2005/0027885 | A1 * | 2/2005 | Dedera et al. | 709/246 |
| 2008/0134237 | A1 * | 6/2008 | Tu et al. | 725/38 |

FOREIGN PATENT DOCUMENTS

JP    2012093461 A  *  5/2012  ................ G09F 3/02

* cited by examiner

*Primary Examiner* — James A Reagan
(74) *Attorney, Agent, or Firm* — Lee & Hayes, PLLC

(57) ABSTRACT

A client-to-service compatibility framework is described that allows online entities to provide a single set of service offerings for client devices of multiple different brands and/or models, such as televisions, set-top-boxes, game consoles, and portable media players, for example. Generally, the client-to-service compatibility framework comprises a plurality of plug-ins or adapters that translate communications from client devices to a form compatible with the online entity's service offerings and vice versa. In this manner, online entities are able to insulate their service offerings from the changing communication needs of client devices.

25 Claims, 7 Drawing Sheets

CLIENT-TO SERVICE COMPATIBILITY FRAMEWORK

BACKGROUND

Online entities offer a wide variety of services to a variety of different client devices, including personal computers (PCs), portable digital assistants (PDAs), mobile telephones, pocket PCs, smartphones, set-top boxes, digital video recorders (DVRs), gaming consoles, and other client devices. These client devices often communicate differently. For example, different devices may use different communication protocols, different data formats, different security mechanisms, and may even transmit different data.

Typically, an online entity that wishes to provide services to devices that communicate differently must customize their services to meet the communication needs of each different device. For example, envision that a hypothetical online entity offers three different services to five different types of client devices that each communicate differently. In this example, the online entity would need to offer fifteen customized services (three for each of five different device types).

The number of client devices available is rapidly increasing. To stay competitive in the marketplace, online entities must adapt their services to support the ever-growing number of different device types. Customizing individual services to communicate with each different type of client device becomes increasingly burdensome and costly as the number of services and/or number of device types increases. This problem is compounded by the fact that anytime an online entity makes a change to one of their service offerings, this change must be propagated across the customized services for each supported device type.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

Figure 1:
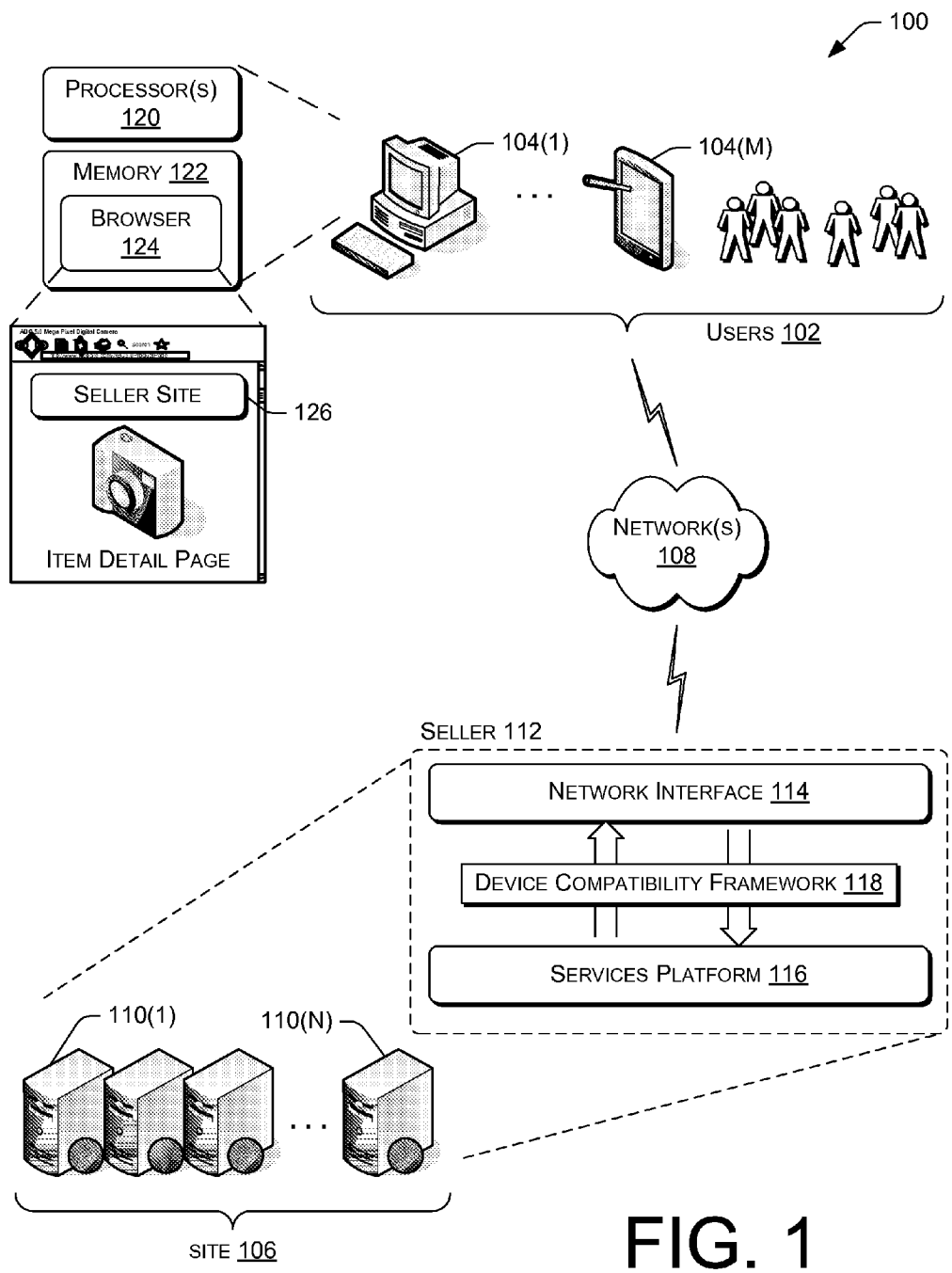
FIG. 1 is a schematic diagram of an illustrative system architecture usable to facilitate client-to-service compatibility.

To stay competitive in the marketplace, online entities desire to make their services available to as many customers as possible. However, as mentioned above, it is burdensome on online entities to customize and continually update their service offerings to meet the communication needs of the ever-increasing number of client device types on the market.

This disclosure describes a client-to-service compatibility framework that allows online entities to provide a single set of service offerings for client devices regardless of brand and/or model. The concepts described herein are applicable to a wide variety of client devices, including both general purpose devices such as personal computers and special purpose devices that are designed with limited functionality in mind. However, the compatibility concepts are particularly convenient when used to communicate with special purpose devices because those devices are not as easily updated or adapted to integrate with service providers' systems. General purpose devices are those that are readily capable of being updated by installing and running new software. Whereas special purpose devices typically are incapable of installing and running software applications. Most consumer electronics devices fall in the class of special purpose devices. Such special purpose devices typically are updatable, if at all, by updating their firmware. For many special purpose devices, updating firmware is the only way of updating the device. By way of example and not limitation, special purpose devices include televisions, set-top-boxes (e.g., digital video recorders, cable boxes, etc.), game consoles, and portable media players. Because these special purpose devices are difficult or impossible to update or adapt to service providers' systems, it may be beneficial for the service providers' systems to be able to adapt to and communicate using communications compatible with the special purpose devices.

In some implementations, the client-to-service framework may allow an online entity to communicate with and support multiple different brands and models of special purpose devices, multiple different brands and models of general purpose devices, or multiple different brands and models of special purpose and general purpose computing devices.

Generally, the client-to-service compatibility framework described herein comprises a plurality of plug-ins or adapters that translate communications from client devices to a form compatible with the online entity's service offerings and vice versa. In this manner, online entities are able to insulate their service offerings from the changing communication needs of client devices.

Adapters may be created and maintained for each device by the online entity and/or by the device manufacturer. Adapters may be generated from scratch or by tailoring a generic adapter template for use with a specific client device. If a template is used to create an adapter, the adapter template may contain application programming interfaces (APIs) creating hooks to use the online entity's services.

While implementations of the present disclosure are described in the context of online sellers of digital items, unless otherwise specified, the techniques described herein are applicable to any transactions involving goods or services offered by an online entity over a network such as the Internet. Aspects of this disclosure may be applicable to translation of other communications as well. As an overview, "digital items" may include media including text, images, audio, video, and combinations of these or any other media stored in an electronic format. "Purchasing," "ordering," or "selling" an item may include both permanent (e.g., assignments, sales, etc.) and temporary transactions (e.g., rentals, leases, etc.), as well as transfers of all (e.g., assignments, sales, etc.) or less than all of one's rights (e.g., licenses).

Illustrative System Architecture

Various techniques facilitating compatible communication between a host online entity and one or more client devices is described in the context of an online seller site and associated servers. One illustrative implementation of this context is described below. However, communication between a host and one or more client devices may also be implemented in other contexts. Moreover, other communication techniques may be realized using the system architecture described herein.

FIG. 1 illustrates an example architecture 100 that allows an online seller to offer a set of services to multiple different client devices over the online seller's site, without the need to customize the services for multiple different client devices. In the architecture 100, customers 102 may utilize client computing devices 104(1), . . . , 104(M) to access a site 106 via a network 108. The network 108 represents any one or combination of multiple different types of networks, such as cable networks, telephone networks, the Internet, and wireless networks.

One or more servers 110(1), . . . , 110(N), perhaps arranged in a cluster or as a server farm, host the site 106. Other server architectures may also be used to host the site 106. The site 106 is capable of handling requests from many users and serving, in response, various web pages that can be rendered at the client computing devices 104(1)-(M). The site 106 can be any type of site that supports user interaction, including online retailers, informational sites, social networking sites, blog sites, search engine sites, news and entertainment sites, and so forth. Additionally, the site may be representative of proprietary sites that receive requests and provide content over proprietary networks other than the Internet and public web.

In the illustrative environment, the site 106 represents an online seller site that hosts an electronic catalog with one or more digital items available for purchase. The illustrated example is described in the context of a seller of digital items such as audio, video, and textual downloads. However, the client-to-service compatibility techniques described herein are applicable to sales of any items (tangible, digital, or otherwise). In some implementations, the item may be offered by the seller for consumption. However, in some implementations, the seller may host items that others are selling using the seller's site.

In FIG. 1, systems of an online seller 112 are implemented in memory of one or more of the servers 110. The seller 112 comprises a network interface 114 including an input for receiving communications from one or more of the client devices 104 via the network and an output for sending communications to the one or more client devices 104. Incoming communications received at the network interface 114 from client devices 104 typically are not compatible with other programs and services running the online seller's servers. For example, incoming communications from client devices 104 may be in a communication protocol that is incompatible with the online seller's systems. Incoming communications may also contain data or data formats that are not supported by the online seller's systems and/or may use security mechanisms that are not compatible with the online seller's systems.

Thus, before being forwarded to a services platform 116 of the seller 112 for processing, incoming communications are translated by a device compatibility framework 118 to a form that is compatible with the online seller's systems. In one specific example, a communication protocol received from a client device in hypertext transfer protocol (HTTP) may be translated by the device compatibility framework 118 to a simple object access protocol (SOAP) used by the online seller's systems. In another example, a communication received in a plaintext format of a client device may be translated by the device compatibility framework 118 into extensible markup language (XML) format used by the online seller's systems. Any or all of a communications protocol of the communication, a format of the data in the communication, a security mechanism of the communication, and even the data itself may be translated by the device compatibility framework 118 to a form usable by the online seller's systems. FIG. 1 illustrates an example in which conversion is made directly from a device-specific communication to a communication usable by a services platform 116 and vice versa. However, in other implementations, an intermediate conversion may be made as described in more detail below with reference to FIG. 2. Still other conversions or translations may additionally or alternatively be made by device compatibility frameworks according to other implementations.

As discussed above, customers may purchase items via the site 106 using computing devices 104(1)-(M). The client computing devices 104(1)-(M) may be implemented as any number of computing devices, such as a personal computer (PC), a laptop computer, a portable digital assistant (PDA), a mobile phone, a pocket PC, a smartphone, a set-top box, a digital video recorder (DVR), a game console, and so forth. As illustrated, each client computing device is equipped with one or more processors 120 and memory 122 to store applications and data. According to some embodiments, a browser application 124 is shown stored in the memory 122 and is executable on the processor(s) 120 to provide access to the site 106. The browser 124 renders web pages of, for example, a seller site 126 served by the site 106 on an associated display. Although embodiments are described in the context of a web-based system, other types of client/server-based communications and associated application logic could be used.

Illustrative Online Seller Systems

Figure 2:
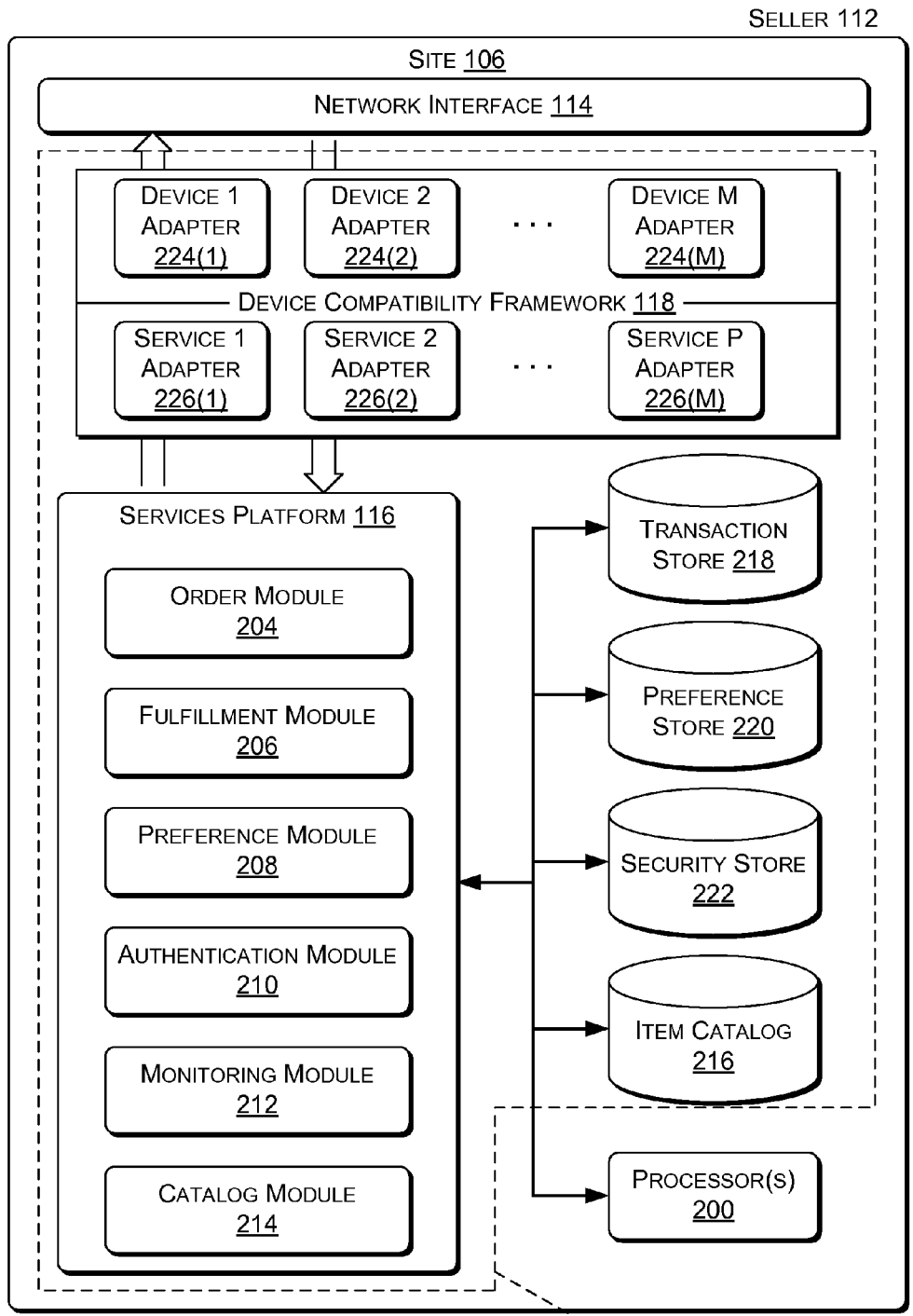
FIG. 2 is a schematic diagram showing details of an illustrative web server usable with the system of FIG. 1 including a device compatibility framework facilitating communication between various client devices and a services platform.

FIG. 2 illustrates a variation of the online seller site 106 in more detail. As shown in FIG. 2, the seller site 106 comprises one or more web servers 110 (FIG. 1). Each web server 110 includes one or more processors 200 and memory 202. Memory 202 may include volatile memory (such as RAM), nonvolatile memory, removable memory, and/or non-removable memory, implemented in any method or technology for storage of information, such as computer-readable instructions, data structures, program modules, or other data. Also, the processor(s) 200 may include onboard memory in addition to or instead of the memory 202. Some examples of storage media that may be included in memory 202 and/or processor(s) 200 include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the processor(s) 200. At least one of the web servers 110 includes the network interface 114 for handling incoming and outgoing communications over the network 108.

The services platform 116 and the device compatibility framework 118 are stored in memory 202 of the servers 110. As shown in FIG. 2, the services platform 116 includes program modules implementing the various service offerings of the seller 112. In the illustrated example, the services platform 116 includes an order module 204, a fulfillment module 206, a preference module 208, an authentication module 210, a monitoring module 212, and a catalog module 214. In other examples, other service modules may be provided as necessary or desired for a given online entity.

The order module 204 receives and processes incoming orders for items available for purchase from an online catalog 216. Upon receiving a new order, the order module 204 may create a record of the purchase in a transaction store 218. The order module 204 may also update existing order records in the transaction store 218 upon receiving a request to modify or cancel an existing order. Once an order has been placed, the fulfillment module 206 fulfills the order by, for example, locating the item(s) ordered and sending them to the client device that placed the order. In the case of an order for a digital item, fulfillment may include, for example, sending a link to download the ordered digital item.

The preference module 208 collects, updates, and otherwise manages user preference information from users of client devices. For example, the preference module 208 may store user account information, address information, payment information, user interface display preferences, user permissions, or the like. The preference module 208 stores the preference information in a preference store 220.

The authentication module 210 authenticates client devices 104 to the online seller site 106 and identifies permissions associated with the client devices 104. For example, if a client device requests to download a digital item, the authentication module 208 may verify that the client device has the appropriate security credentials (e.g., password, security certificate, etc.) and has permission to download the requested digital item (e.g., has paid for the digital item). The authentication module 210 may determine authentication of a client device by comparing a security credential provided by the client device (e.g., password or certificate) with a security credential stored in a security store 222 associated with the client device. The authentication module 210 may determine whether the client device has permission to download a particular item by reference to an order record in the transaction store 218, preference information in the preference store 220, or a security credential in the security store 222, for example.

The monitoring module 212 is in communication with the network interface 114 directly or via the device compatibility framework. The monitoring module 212 monitors interactions of client devices 104 with the online seller site 106 to manage network traffic, establish and manage connections with client devices, maintain a record of incoming and outgoing communications, and otherwise monitor system events. The monitoring module 212 may also report on status of any or all of the foregoing events to an administrator of the site 106.

The catalog module 214 controls presentation of the item catalog 216 to the user. For example, the catalog module 214 is responsible for serving item detail pages associated with particular items to the browser 124 of client devices when a user of the client device navigates to the respective item detail page. How the catalog module 214 presents the item catalog 216 to the client device may depend on display preferences stored in preference store 220, device characteristics (e.g., screen size, processing power, network connection speed, etc.), or the like.

Collectively, the service modules provide the functionality behind the services offered to customers of the online seller. In the example shown in FIG. 2, the device compatibility framework 118 comprises a two layer framework, a device-specific layer and a service-specific layer. The device-specific layer of the device compatibility framework 118 includes a plurality of device-specific adapters 224(1), 224(2), . . . 224(M), typically one for each different type of client device that is to be supported by the online seller site 106. The adapters 224 may be created and maintained for each device by the online seller. Alternatively, the online seller may provide a generic adapter as part of a software development kit (SDK) that includes one or more APIs usable to communicate with systems of the online seller. Device manufacturers desiring their products to be compatible with the online seller's services, may then modify the generic adapter to recognize the protocol, data format, security mechanisms, and the dataset used by the particular client device.

The service-specific layer of the device compatibility framework 118 comprises a plurality of service-specific adapters 226(1), 226(2), . . . 226(M). Typically the service-specific layer includes an ownership/rights module that directs communication between and among the other service-specific adapters and the device-specific adapters. The service-specific layer also typically includes a service-specific adapter for each different service offered by the online seller site 106. In this two-layer version of the device-compatibility framework 118, communications between the device-specific adapters 224 and the client devices 104 may be carried out in a native communication protocol of the respective client devices. Communications between the service-specific adapters 226 and the services platform 116 may be carried out in a native communication protocol of the respective service modules (which may be the same for all services or may vary from service-to-service), such as a proprietary communication protocol of the seller 112. Communications between device-specific adapters 224 and service-specific adapters 226 may be carried out in a variety of different protocols including the proprietary protocol of the seller 112, an extensible markup language (XML), binary, or another intermediary.

By employing the device compatibly framework 118 to translate incoming and outgoing communications, the services platform 116 need only include one version of each service module to support multiple types of client devices and communication formats (as opposed to a customized service module for each different client device). When the seller 112 modifies a service, the modification will be automatically propagated across all device types by virtue of the device-specific adapters 224.

Illustrative Device-Specific Adapters

Figure 3:
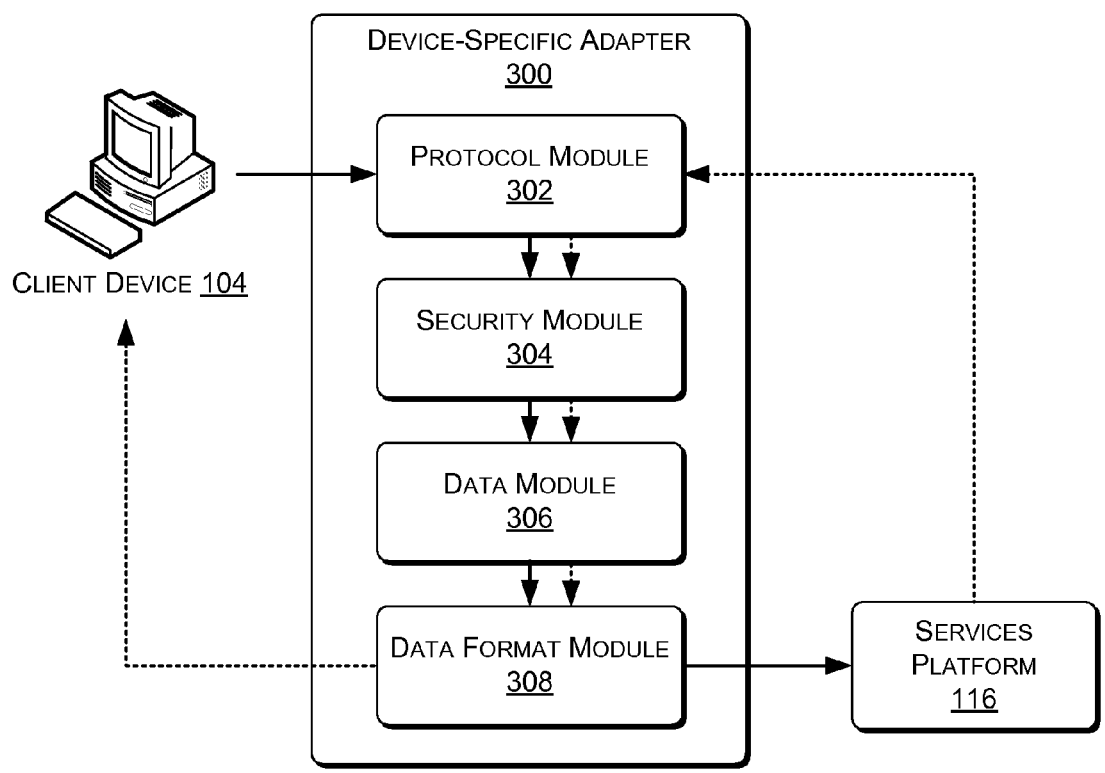
FIG. 3 is a schematic diagram of an illustrative device-specific adapter forming part of the device compatibility framework of FIG. 2.
Figure 4:
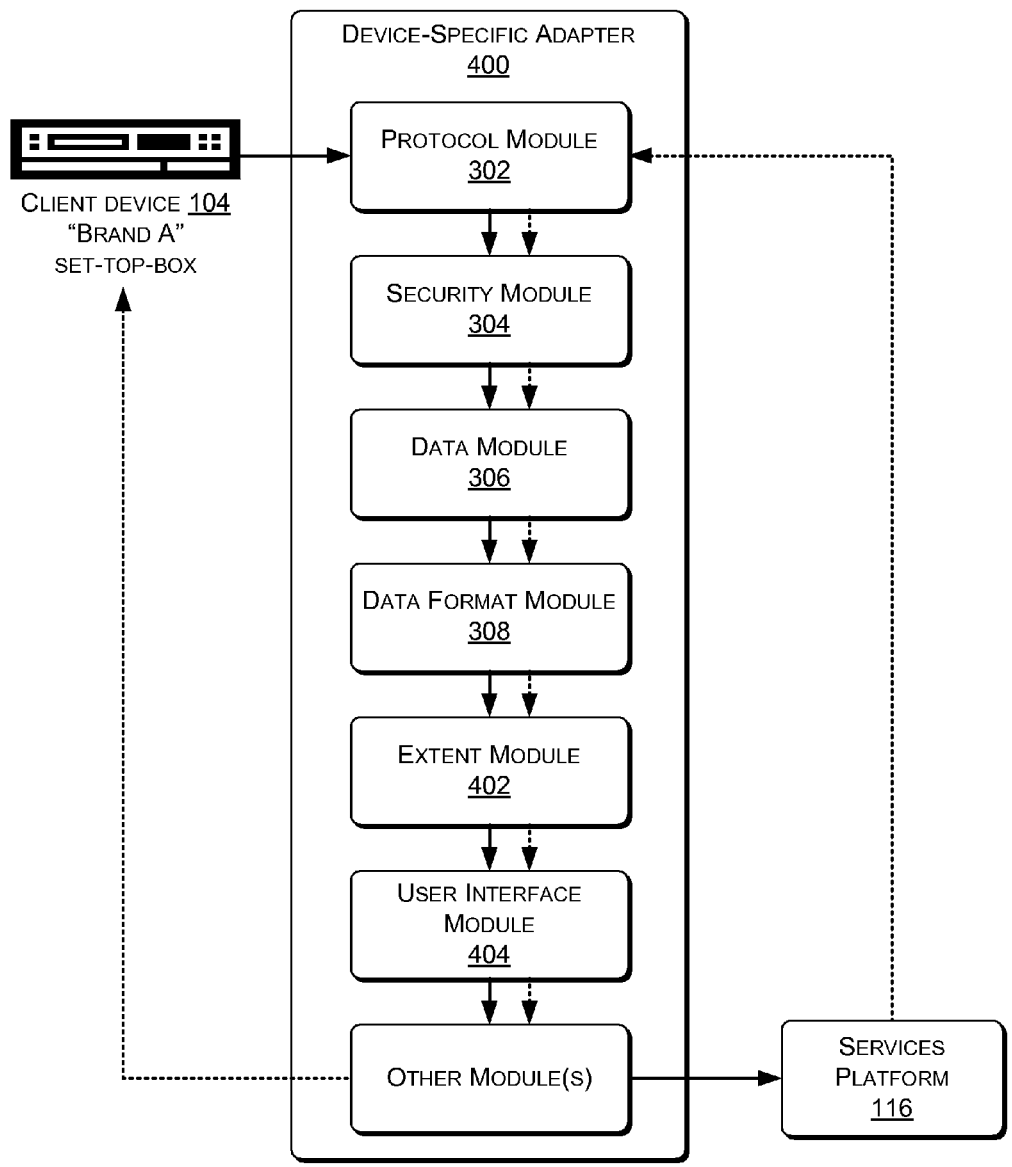
FIG. 4 is a schematic diagram showing another illustrative example of a device-specific adapter forming part of the device compatibility framework of FIG. 2.

FIG. 3 is a schematic diagram showing details of an illustrative device-specific adapter 300 according to one implementation. In this example, the device-specific adapter 300 is configured to translate communications between a PC client device 104 and the services platform 116 of the online seller site 106. In FIGS. 3 and 4, the solid arrows represent an illustrative process flow during conversion of incoming communications from the client device 104, while the dashed arrows represent an illustrative process flow during conversion of outgoing communications destined for the client device 104.

The adapter 300 in this example includes a protocol module 302 to convert a communications protocol of incoming communications from a device-specific protocol to a protocol used by the services platform 116 of the seller 112 and vice versa. Examples of communications protocols that the protocol module 302 may convert to or from include, without limitation, Internet protocol (IP), transmission control protocol (TCP), hypertext transmission protocol (HTTP), hypertext transfer protocol over secure socket layer (HTTPS), simple object access protocol (SOAP), simple mail transfer protocol (SMTP), file transfer protocol (FTP), AppleTalk protocol, and the like.

Generally, each adapter 300 is configured to convert incoming communications from the client device protocol to the online entity protocol and outgoing communications from the online entity protocol to a protocol of the destination client device. However, in some instances, the adapter 300 may be configured to receive communications in multiple different incoming protocols and/or to translate communications into multiple different outgoing protocols. In that case, the adapter 300 may include multiple protocol modules 302 (one for each translation) or may include a protocol module 302 capable of performing multiple translations. In that case, the protocol module 302 may include logic to intelligently determine which protocol conversion to perform on a given communication based on contents of the communication (e.g., sender, recipient, client identification, etc.).

The adapter 300 also includes a security module 304 to convert a security mechanism of a client device 104 to a security mechanism used by the services platform 116 of the seller 112 and vice versa. Examples of security mechanisms that the security module 304 may convert to or from include, without limitation, public key infrastructure (PKI), transport layer security (TLS), third-party certificate or web of trust, pretty good privacy (PGP), password protection, and other digital rights management (DRM) mechanisms. Additionally or alternatively, the security module 304 may convert between a standard security mechanism, an encrypted security mechanism, and/or a hash or other subset of a security mechanism.

The device-specific adapter 300 also includes a data module 306 and a data format module 308 configured to convert the data in a communication and its format from a form usable by the client device 104 to a form usable by the services platform 116 and vice versa. Data refers to the actual bits contained in the communication, while the format of the data refers to the arrangement of that data in the communication. For example, different client devices may use different data to represent the same or different instructions. Thus, the data module 306 may translate one bit of data from a client device 104 to another bit of data usable by the services platform 116 according to a look-up table, for example. The data format module 308 is configured to convert data from one format used by the client device 104 to another format used by the services platform 116 and vice versa. Examples of data formats that the data format module 308 may convert to or from include, without limitation, hypertext markup language (HTML), extensible markup language (XML), comma-separated value (CSV), plaintext, etc.

FIG. 4 is a schematic diagram showing details of another illustrative device-specific adapter 400. In this example, the client device 104 comprises a set-top-box (e.g., a "Brand A" set-top-box). The device-specific adapter 400 in this example includes, in addition to the modules shown in FIG. 3, a extent module 402 to determine an extent of information available at the services platform 116 that should be sent to the client device 104, a user interface (UI) module 404 to determine what information a UI of the client device 104 is configured to employ, and one or more other modules.

The extent module 402 may, for example, determine to send certain content (e.g., only audio and video content) of a requested item, and may determine to filter or omit other content available at the services module and associated with the requested item, such as closed captioning information, foreign language audio, trailers, additional scenes, a written synopsis of the item, cast and credits for the item, commentary on the item, previews of other items, customer ratings of the item, interactive menus or games, or the like. The extent module 402 may determine what information to send based on one or more extent criteria, such as capabilities of the client device 104, a price paid for the item, a subscription level of a user of the client device, permissions of a user of the client device, user preference information, user viewing history, available transmission bandwidth, or the like.

The UI module 404 may determine to send or not send any of the information mentioned above for the extent module 402, but the determination made by the UI module 404 is based on the UI capabilities of the client device 104. For example, if a UI of a particular client device lacks the ability to display closed captioning, the UI module may determine not to send closed captioning information to the client device along with the requested content. In another example, if a UI of a particular client lacks the ability to display an interactive menu, the UI module may determine not to send an interactive menu to the client device along with the requested content.

Illustrative Streaming Ordering Methods

Figure 5:
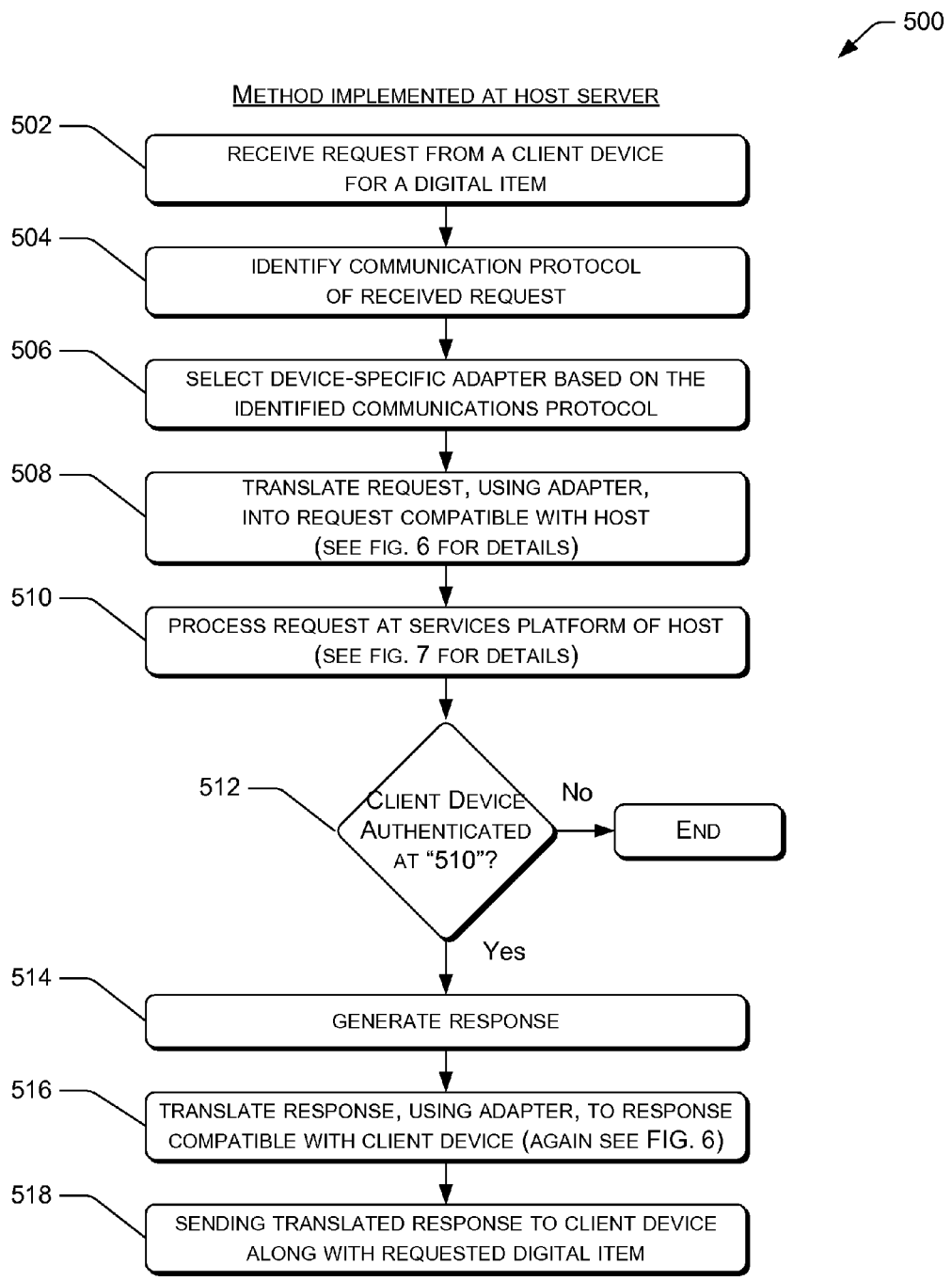
FIG. 5 is a flowchart of an illustrative method of communication between a host and one or more client devices.

Various techniques and environments for translation of communications from client devices to a form compatible with the online entity's service offerings and vice versa are described above. FIG. 5 is a flowchart showing one illustrative client-to-service compatibility method 500 that may, but need not, be implemented at servers of the online seller site shown in FIGS. 1-4. The method 500 will be described in the context of the architecture of FIGS. 1-4 for convenience and clarity. While the method 500 is described in the context of communications between a client device and an online seller, the method may be more broadly applied to transactions between client devices and other online entities or hosts.

At 502, a server of the seller 112 receives a request from a client device 104 for a digital item available for purchase from the seller 112. Based on the received request, at 504, a server of the seller 112 determines a protocol of the received request, and hence a protocol to use in communicating with the client device 104. Additionally or alternatively, the protocol of the client device may be determined by correlating a client device identifier in the communication with a protocol for the client device using a look-up table, for example. At 506, the online seller selects a device-specific adapter 224 to use to convert incoming communications from the client device 104 to a form readable by the services platform 116 of the seller 112. The adapter 224 may be chosen based on the communication protocol identified at 504.

At 508, the request is translated, using a device specific adapter such as those shown in FIGS. 2, 3, and 4 (224, 300, or 400), into a request that is compatible with the services platform 116 of the seller 112. Additional details of an illustrative translation process are described below with reference to FIG. 6. Once translated, the request is processed, at 510, by one or more of the service modules of the services platform 116. Additional details of illustrative processing by the services platform 116 are described below with reference to FIG. 7.

At 512, the server of the online seller determines if the client device was properly authenticated during the processing and, if so, proceeds to generate a response to the request at 514. If, as in the illustrated example, the request was for a digital item to which the client device is entitled, the response will typically include a payload comprising the requested digital item. If the client device was not properly authenticated, either because the request lacked the necessary security mechanism or permissions, the process terminates and no response is sent.

Before the response can be sent to the client device, at 516, the response is translated using the same device-specific adapter to the format readable by the client device. Finally, after translation, at 518, the response is sent to the client device.

Figure 6:
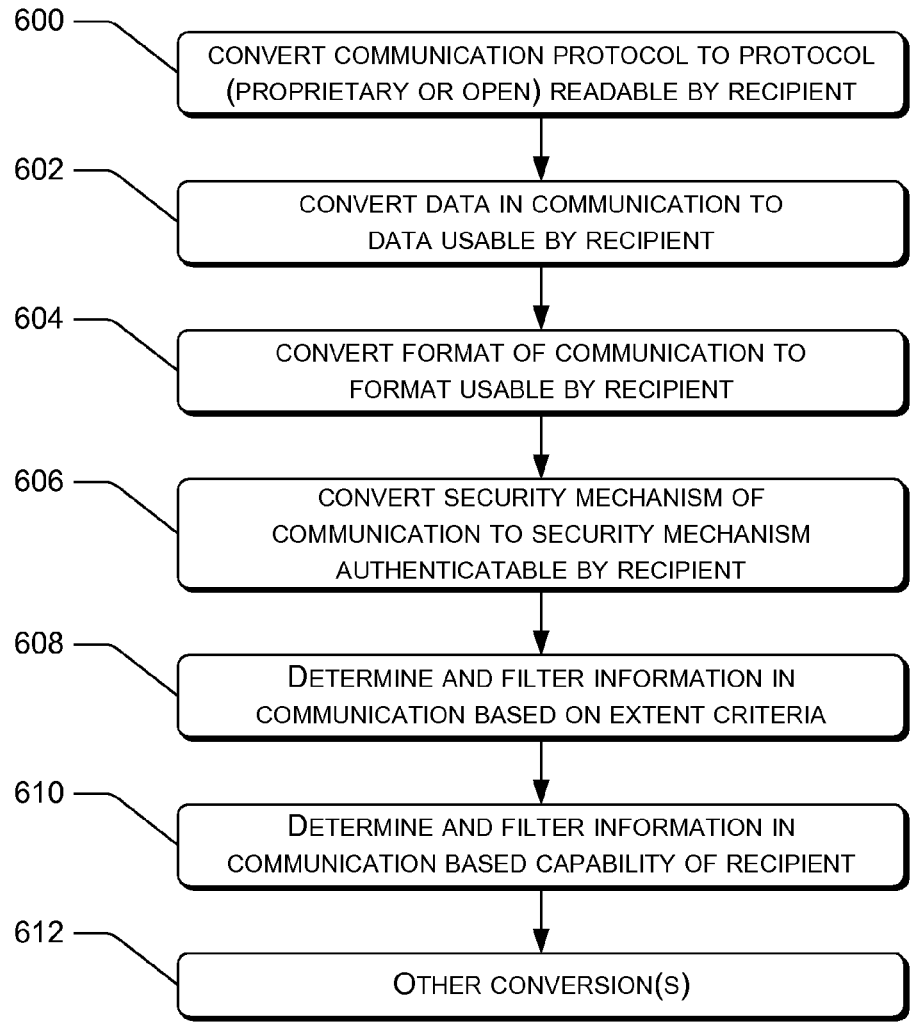
FIG. 6 is a flowchart showing additional details of the illustrative translation shown in blocks 508 and 516 of FIG. 5.

FIG. 6 illustrates additional details of the translation process (block 508 in FIG. 5). For the purpose of this discussion, the recipient of incoming communications (e.g., the request) is the services platform 116 of the seller 112 and the recipient of outgoing communications (e.g., the response) is the client device 104.

The translation process 508 includes, at 600, converting a communication protocol of the communication to a protocol readable by the recipient of the communication. The translation may be performed using a protocol module 302, such as that shown in FIG. 3. As discussed above, the protocol module 302 may convert to or from any of IP, TCP, HTTP, HTTPS, SOAP, SMTP, FTP, and AppleTalk protocol, to name just a few.

At 602, the actual data in the communication is converted by a data module 306, if necessary, to a format readable by the recipient. For example, different devices may use different data to represent the same information. Additionally or alternatively, some devices may include data that is not applicable or not supported by the recipient. In those cases, the inapplicable or non-supported data may be translated to other data or may be stripped from the communication.

At 604, a format of the communication is translated by a data format module 308 to a format usable by the recipient. As discussed above, the data format module 308 may convert to or from, without limitation, HTML, XML, CSV, and plaintext, to name just a few.

A security mechanism of the communication may also be converted by a security module 304 of the adapter, at 606, to a security mechanism authenticatable by the recipient. As discussed above, the security module 304 may convert to or from, without limitation, PKI, TLS, third-party certificate (a so called "web of trust"), PGP, and password protection, to name just a few.

In some implementations, the adapter may also include an extent module 402, a user interface (UI) module 404, and/or one or more other modules. In those implementations, at 608, the extent module 402 may determine to send certain content (e.g., audio and video content) of a requested item, while filtering out or omitting other content available at the services module and associated with the requested item. At 610, the user interface module 404 may determine to send or not send information associated with a requested item based on the UI capabilities of the client device 104. At 612, one or more other modules may perform additional conversions to the communication so that the communication is usable by the recipient.

Figure 7:
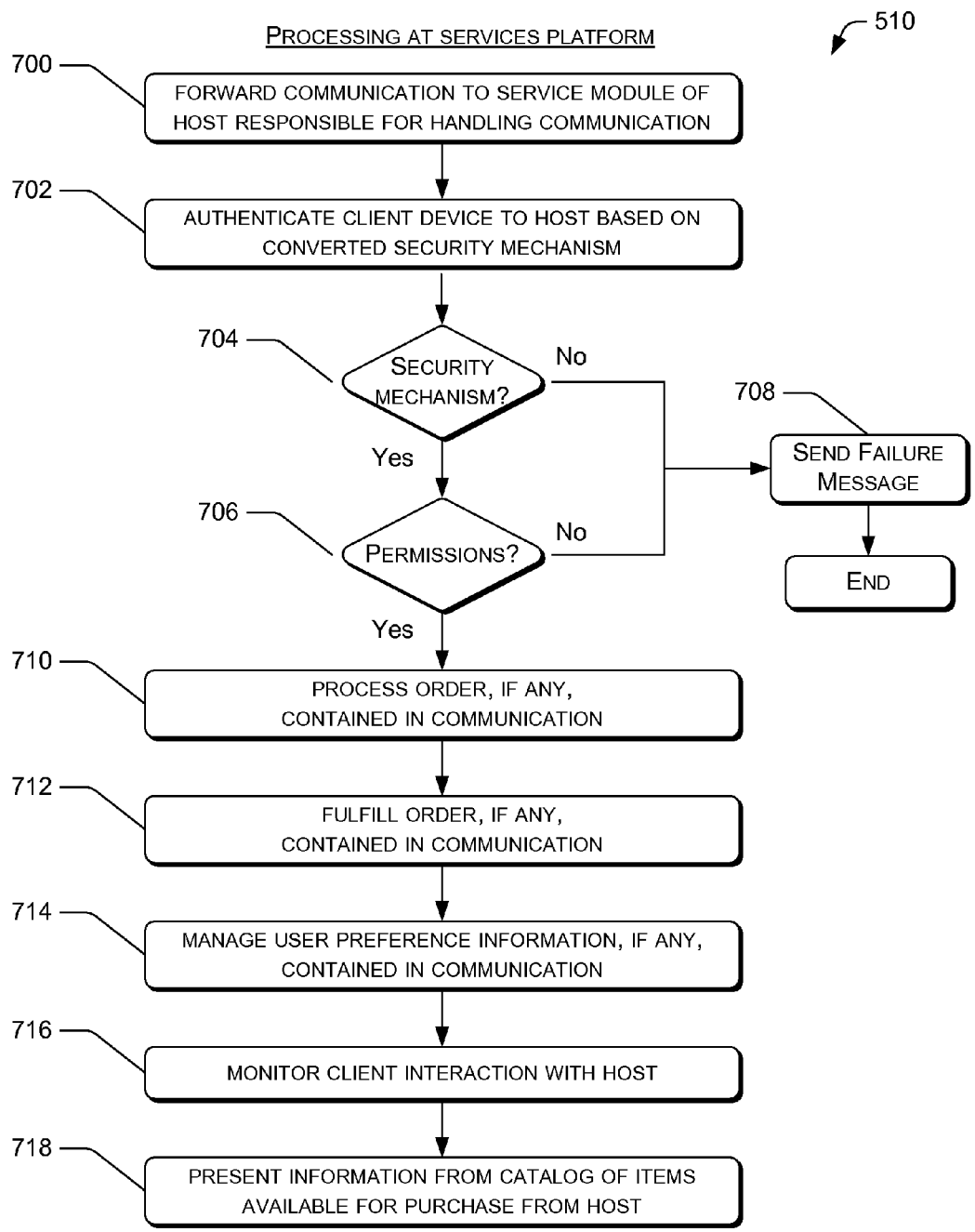
FIG. 7 is a flowchart showing additional details of the illustrative process shown in block 510 of FIG. 5.

FIG. 7 illustrates additional details of processing the request (block 510 in FIG. 5) by the services platform 116. Initially, at 700, the communication is forwarded to a service module of the service platform 116 that is responsible for handling the communication. For example, if the communication contains a new order, it may be forwarded to the order service module 204 and/or the fulfillment module 206. If on the other hand, the communication contains a request to view an item detail page, it may be forwarded to the catalog module 214 to have the requested page served to the browser of the requesting client device.

At 702, the authentication module 210 attempts to authenticate the client device based on the converted security mechanism of the communication (e.g., PKI certificate, password, etc.). Specifically, the authentication module may determine, at 704, if the communication has the appropriate security certificate. This determination may be made by comparison of a received security certificate with a security certificate on file in the security store 222 for the client device. If the security certificate matches, the authentication module 210 may also determine, at 706, if the client device sending the communication has permission to receive the requested digital item. For example, the authentication module may determine whether payment has been received for the requested digital item. If the appropriate security mechanism is missing and/or the client device lacks the proper permissions, a failure message may be sent at 708, and the process may end. If, however, the appropriate security mechanism is present and the client device has the proper permissions, the communication is routed to one or more other service modules of the services platform 116 for further processing.

If the communication contains a new or modified order, at 710, the communication may be routed to the order module 204 for processing. For example, a record of the order may be generated or updated in the transaction store 218. The communication may then be routed to the fulfillment module 208, at 712, to fulfill the order and package the requested item(s) to send to the client device.

If the communication contains new or updated preference information, at 714, the communication is sent to the preference module 208 create or update preference information in the preference store 220, or otherwise manage the preference information.

At 716, the communication may be forwarded to a monitoring module 212, where a record of the communication may be logged.

If the communication includes a request to view an item detail page of the catalog, at 718, the communication is forwarded to the catalog module 214 to have the requested page served to the browser of the requesting client device from the item catalog 216.

Certain acts in method 500 need not be performed in the order described, may be modified and/or may be omitted entirely, depending on the circumstances. For example, in some implementations, methods may not provide for converting or filtering an extent of information transmitted to a client device based on one or more extent criteria and/or based on a user interface capability of the client device. Moreover, in some implementations, the additional conversions may be performed. Also, as discussed above, while the method 500 is described in the context of an online seller, the method may be implemented more generally for other types of online entities.

Any of the acts of any of the methods described herein may be implemented at least partially by a processor or other computing device based on instructions stored on one or more computer-readable media. Computer-readable media can be any available media that can be accessed by a system of the host. By way of example, and not limitation, computer-readable media may comprise volatile and nonvolatile, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by a system of the host. Combinations of the any of the above should also be included within the scope of computer-readable media.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. One or more computer-readable media comprising computer-executable instructions that, when executed by a processor of a host comprising an online site that provides an electronic catalog having one or more items available for acquisition, configure the processor to perform acts comprising:
   receiving a request for a digital item from the electronic catalog, the request received from a consumer electronics device;
   identifying a brand and model combination of the consumer electronics device that sent the request;
   selecting a services adapter from a plurality of services adapters available to the host based on the identified brand and model combination of the consumer electronics device, individual services adapters from the plurality of services adapters corresponding to a particular brand and model combination different than each other brand and model combination;
   translating the request, using the services adapter, into a request compatible with the host by:
      converting a host protocol of the request to a particular protocol readable by the consumer electronics device;
      converting data in the request to host data usable by a services platform of the host;
      converting a format of the request to a host format usable by the services platform of the host; and
      converting a security mechanism of the request to a host security mechanism authenticatable by the services platform of the host;
   processing the request at the services platform of the host;
   generating a response to send to the consumer electronics device, the generated response being in the host protocol that is readable by the services platform of the host;
   translating the response, using the services adapter, into a response compatible with the consumer electronics device by converting the host protocol that is readable by the services platform of the host to the particular protocol; and
   sending the translated response to the consumer electronics device along with the requested digital item.

2. The one or more computer-readable media of claim 1, wherein translating the response comprises:
   converting the host protocol of the response to the particular protocol readable by the consumer electronics device;
   converting host response data in the response to device data usable by the consumer electronics device;
   converting a host format of the response to a format usable by the consumer electronics device; and
   converting a host security mechanism of the response to a security mechanism that is authenticatable by the consumer electronics device.

3. A method implemented at least partially by a host, the method comprising:
   receiving a communication from a consumer electronics device, the consumer electronics device comprising a special purpose device;
   identifying a brand and model of the consumer electronics device that sent the communication;
   selecting a services adapter from a plurality of services adapters for consumer electronics devices of multiple different combinations of brands and models, the selection based on the brand and model of the consumer electronics device, individual services adapters from the plurality of services adapters corresponding to a particular brand and model that is different than other brand and model combinations; and
   translating the communication, using the services adapter, into a communication compatible with the host, translating the communication comprising:
      converting data in the communication to host data usable by a services platform of the host;
      converting a format of the communication to a host format usable by the services platform of the host; and
      converting a security mechanism of the communication to a host security mechanism authenticatable by the services platform of the host.

4. The method of claim 3, wherein the consumer electronics device comprises a device that is incapable of installing and running new software.

5. The method of claim 3, wherein the consumer electronics device comprises a device that is updatable only by firmware update.

6. The method of claim 3, wherein the consumer electronics device comprises one of a television, a set-top-box, a game console, and a portable media player.

7. The method of claim 3, further comprising authenticating the consumer electronics device by the host based on the host security mechanism.

8. The method of claim 3, wherein the host protocol comprises a proprietary protocol.

9. The method of claim 3, wherein the host comprises a server of an online seller of digital items, and wherein the communication comprises a request for a digital item available for purchase from the online seller.

10. The method of claim 3, further comprising forwarding the communication to a service module of the host, the service module to process the communication.

11. The method of claim 10, further comprising, at the service module:
   processing a purchase order contained in the communication;
   managing user preference information contained in the communication;
   initiating fulfillment of the purchase order contained in the communication;
   monitoring interaction of the consumer electronics device with the host;
   presenting information from a catalog of items available for acquisition from the host; or
   authenticating the consumer electronics device to the host.

12. The method of claim 3, further comprising generating a host response to the communication and translating the host response, using the services adapter, into a response compatible with the consumer electronics device.

13. A method comprising:
   generating, at an online site that hosts an electronic catalog including items available for acquisition, a communication to send to a special purpose client device;
   identifying a brand and a model of the special purpose client device;
   selecting a services adapter from a plurality of services adapters based on the brand and the model of the special purpose client device, the plurality of services adapters comprising services adapters for at least two different brand and model combinations of the special purpose client devices that utilize at least two protocols that are incompatible with one another, individual services adapters from the plurality of services adapters corresponding to a particular brand and a particular model combination; and translating the communication, using the services adapter, into a communication compatible with the special purpose client device by:

converting host data in the communication to data usable by the special purpose client device;

converting a host format of the communication to a format usable by the special purpose client device; and converting a host security mechanism of the communication to a security mechanism authenticatable by the special purpose client device.

14. The method of claim 13, wherein the special purpose client device comprises a device that is updatable only by firmware update.

15. The method of claim 13, wherein the special purpose client device comprises one of a television, a set-top-box, a game console, and a portable media player.

16. The method of claim 13, wherein the special purpose client device is identified based on at least one of a previous communication from the client device and a look-up table of client devices.

17. A system comprising:

a network interface to send, from an online merchant that hosts an electronic catalog, outgoing communications to one or more consumer electronics devices and to receive incoming communications addressed to the online merchant from the one or more consumer electronics devices;

a services platform comprising a plurality of service modules, individual service modules corresponding to a particular service offered via the system; and a device compatibility framework to select a device-specific adapter from a plurality of device-specific adapters to enable communication with the services platform, individual device-specific adapters from the plurality of device-specific adapters corresponding to a particular brand and model combination of the one or more consumer electronic devices that is different than other brand and model combinations of the one or more consumer electronic devices, one or more device-specific adapters from the plurality of device-specific adapters comprising:

a protocol conversion module to convert a device protocol of the incoming communications to a platform protocol compatible with the services platform and to convert the platform protocol of the outgoing communications to device protocols that are compatible with the one or more consumer electronics devices;

a data conversion module to convert device data of the incoming communications to platform data usable by the services platform and to convert the platform data of the outgoing communications to corresponding device data usable by the one or more consumer electronics devices;

a format conversion module to convert a device format of the incoming communications to a platform format usable by the services platform and to convert the platform format of the outgoing communications to device formats usable by the one or more consumer electronics devices; and a security conversion module to convert a device security mechanism of the incoming communications to a platform security mechanism authenticatable by the services platform.

18. The system of claim 17, wherein the one or more device-specific adapters further comprise:

an extent module to determine, based on extent criteria, an extent of information for inclusion in a particular communication of the outgoing communications to be sent to an intended recipient of the one or more consumer electronics devices; and a user interface module to determine information for inclusion in the outgoing communications to be sent to the intended recipient based on a capability of a user interface of the intended recipient.

19. The system of claim 17, wherein the services platform comprises:

an order module to process orders placed by users of the one or more consumer electronics devices;

a preference module to manage user preference information;

a fulfillment module to fulfill the orders processed by the order module;

a monitoring module to monitor consumer electronics device interaction with the services platform;

a catalog module maintaining a catalog of items available for purchase from the online seller; and an authentication module to authenticate consumer electronics devices to the services platform.

20. One or more non-transitory computer-readable storage media storing instructions that are executable by one or more processors to perform acts comprising:

receiving a communication from a consumer electronics device, the consumer electronics device comprising a special purpose device;

identifying a brand and model of the consumer electronics device that sent the communication;

selecting a services adapter from a plurality of services adapters for consumer electronics devices of multiple different combinations of brands and models, the selection based on the brand and model of the consumer electronics device, individual services adapters from the plurality of services adapters corresponding to a particular brand and model that is different than other brand and model combinations; and translating the communication, using the services adapter, into a communication compatible with the host, translating the communication comprising:

converting data in the communication to host data usable by a services platform of the host;

converting a format of the communication to a host format usable by the services platform of the host; and converting a security mechanism of the communication to a host security mechanism authenticatable by the services platform of the host.

21. The one or more non-transitory computer-readable storage media of claim 20, the acts further comprising:

authenticating the consumer electronics device by the host based on the host security mechanism.

22. The one or more non-transitory computer-readable storage media of claim 20, wherein:

the host comprises a server of an online seller of digital items; and the communication comprises a request for a digital item of the digital items available for purchase from the online seller.

23. The one or more non-transitory computer-readable storage media of 20, the acts further comprising:

forwarding the communication to a service module of the host, the service module to process the communication.

24. The one or more non-transitory computer-readable storage media of claim 20, further comprising, at the service module:
- processing a purchase order contained in the communication;
- managing user preference information contained in the communication;
- initiating fulfillment of the purchase order contained in the communication;
- monitoring interaction of the consumer electronics device with the host;
- presenting information from a catalog of items available for acquisition from the host; or
- authenticating the consumer electronics device to the host.

25. The one or more non-transitory computer-readable storage media of 20, further comprising:
- generating a host response to the communication; and
- translating the host response using the services adapter into a response compatible with the consumer electronics device.

* * * * *